United States Patent
Mao et al.

(10) Patent No.: US 10,116,194 B2
(45) Date of Patent: Oct. 30, 2018

(54) VIBRATION MOTOR

(71) Applicants: Lubin Mao, Shenzhen (CN);
Rongguan Zhou, Shenzhen (CN);
Huan Ge, Shenzhen (CN)

(72) Inventors: Lubin Mao, Shenzhen (CN);
Rongguan Zhou, Shenzhen (CN);
Huan Ge, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 177 days.

(21) Appl. No.: 15/417,104

(22) Filed: Jan. 26, 2017

(65) Prior Publication Data

US 2018/0115230 A1 Apr. 26, 2018

(30) Foreign Application Priority Data

Oct. 25, 2016 (CN) .................... 2016 2 1164368 U

(51) Int. Cl.
| | |
|---|---|
| *H02K 33/00* | (2006.01) |
| *H02K 33/02* | (2006.01) |
| *H02K 11/215* | (2016.01) |
| *H02K 1/34* | (2006.01) |
| *H02K 5/04* | (2006.01) |

(52) U.S. Cl.
CPC .............. *H02K 33/02* (2013.01); *H02K 1/34* (2013.01); *H02K 5/04* (2013.01); *H02K 11/215* (2016.01)

(58) Field of Classification Search
CPC ........ H02K 33/02; H02K 11/215; H02K 1/34; H02K 5/04
USPC .................................................. 310/25, 68 B
See application file for complete search history.

(56) References Cited

U.S. PATENT DOCUMENTS

| 8,106,552 B2* | 1/2012 | Kim ................. H02K 7/063 310/81 |
|---|---|---|
| 2017/0070132 A1* | 3/2017 | Wang ................. H02K 33/16 |
| 2017/0117791 A1* | 4/2017 | Mao ................. H02K 1/34 |
| 2018/0166965 A1* | 6/2018 | Mao ................. H02K 33/16 |

* cited by examiner

*Primary Examiner* — Thanh Lam
(74) *Attorney, Agent, or Firm* — Na Xu; IPro, PLLC

(57) ABSTRACT

A vibration motor includes a housing; a vibration module including a main magnet and a central shaft extending along a vibration direction and passing through a center of the main magnet; a fixing module located in the housing and including a first coil and a second coil spaced from the main magnet; an elastic connecting part suspending the vibration module in the housing; and a sensor for detecting a displacement of the vibration module along a direction perpendicular to the central shaft. The first coil and the second coil are such arranged that a geometric center of one of the first coil and the second coil deviates from the central shaft, a geometric center of the other of the first coil and the second coil deviates from the central shaft, and the two geometric centers locate at two opposed sides of the central shaft.

9 Claims, 5 Drawing Sheets

VIBRATION MOTOR

FIELD OF THE INVENTION

The present disclosure relates to the vibration motors, and more in particularly to a linear vibration motor used in portable electronic product.

DESCRIPTION OF RELATED ART

In process of fast development of portable products, such as mobile phone, the functional requirement is much higher. In order to make the mobile phone more interesting in musical enjoyment, the music vibrating mode is invented and the linear vibration motor is developed fast also.

Existing vibration motor usually includes a vibrator, a coil, an elastic part and a housing, in which, the coil and the housing are connected firmly. One end of the elastic part is fixed on the vibrator and the other end is fixed on the housing. The vibrator is suspended by the elastic part in the housing.

However, in the existing vibration motor, the vibrator usually produces an unexpected movement along a direction perpendicular to the predetermined vibration direction. If the avoidance space between the vibrator and the housing is not enough or an assembling error exists, the vibrator will easily touch the housing, which makes noise, even damages the vibration motor.

Thereof, it is necessary to disclose an improved vibration motor.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain this disclosure, not intended to limit this disclosure.

Figure 1:
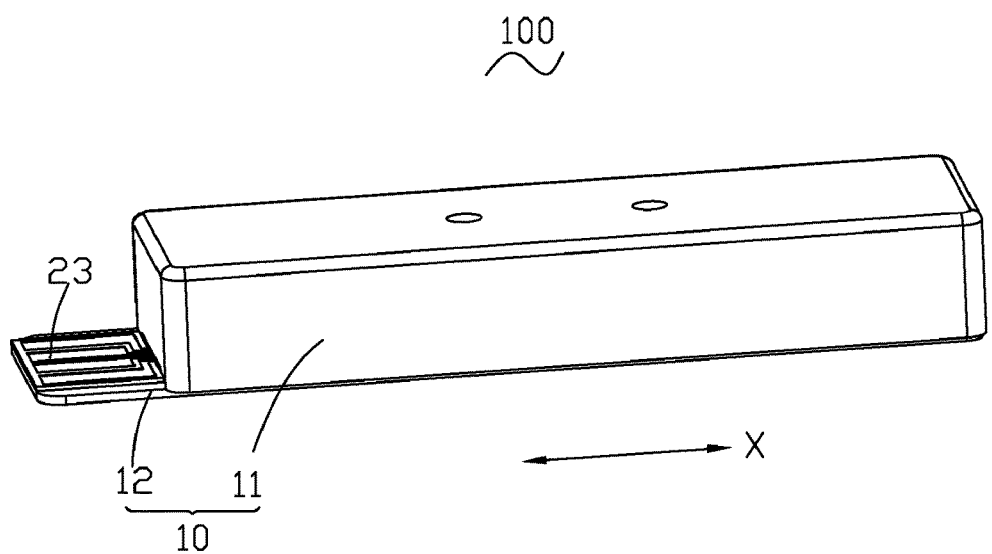
FIG. 1 is an isometric view of a vibration motor in accordance with a first embodiment of the present disclosure.
Figure 2:
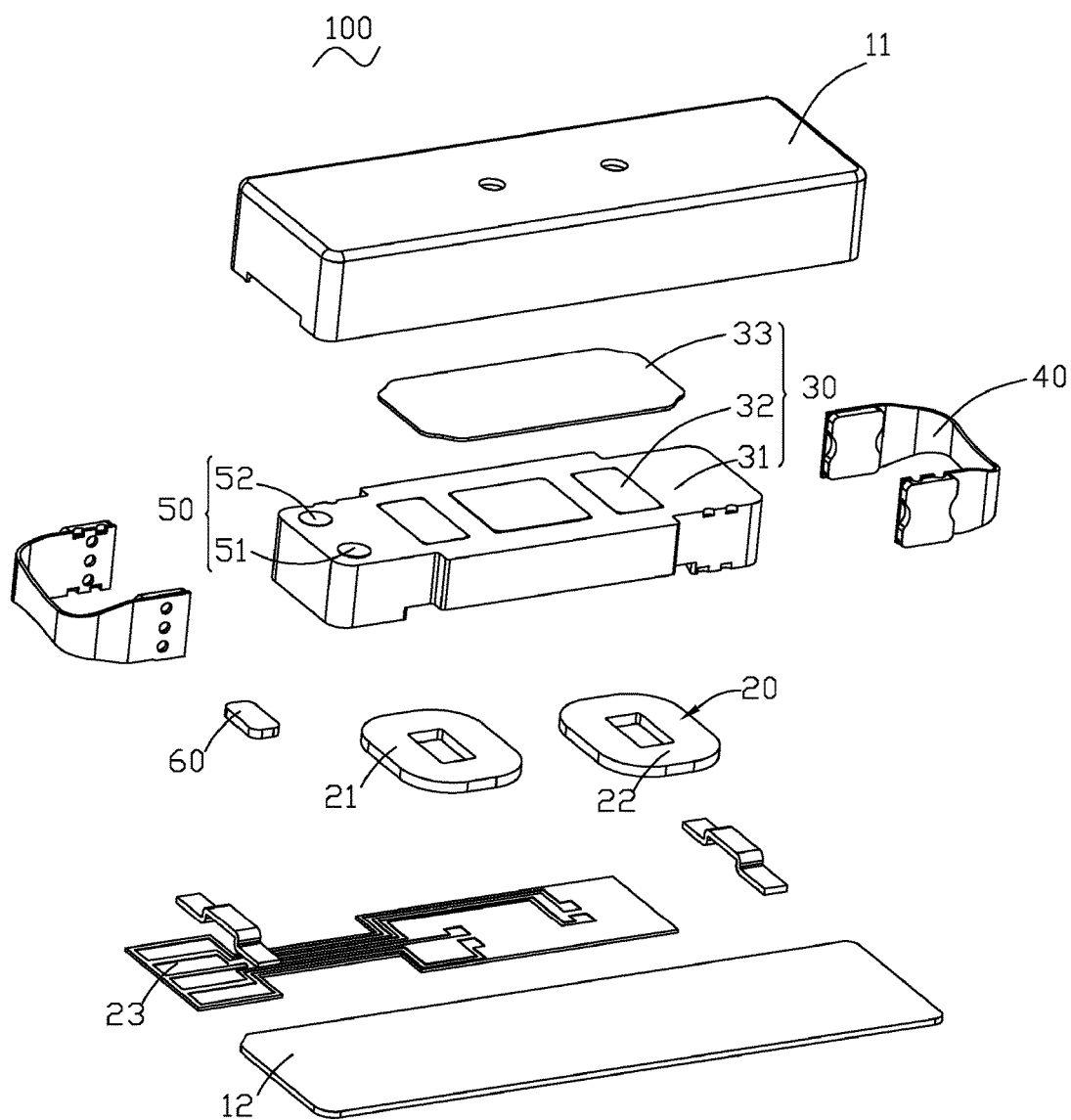
FIG. 2 is an exploded view of the vibration motor in FIG. 1.

Referring to FIGS. 1-5, a vibration motor 100 in accordance with a first embodiment of the present disclosure includes generally a housing 10 which has an accommodation space, a fixing module 20, a vibration module 30, and an elastic connecting part 40 which are all accommodated in the housing 10. The housing 10 includes a housing body 11, a cover plate 12 engaging with the housing 11 and forming the accommodation space with the housing 11. The fixing module 20 is fixed on the cover plate 12. The vibration module 30 is suspended by the elastic connecting part 40 in the accommodation space, and vibrates linearly along direction X as shown in FIG. 1. Direction X is the length direction of the housing 10 in this embodiment.

Specifically shown in FIGS. 1-4, the fixing module 20 includes a first coil 21 fixed on the cover plate 12, a second coil 22 and a circuit board 23. The first coil 21 and the second coil 22 are connected with external circuits (not shown) through a circuit board 50 for receiving electric signals. The vibration module 30 includes a weight 31, a main magnet 32 accommodated in the weight 31 and a pole plate 33. The first coil 21 and the second coil 22 are separated from the main magnet 32 and respectively face the main magnet.

Figure 3:
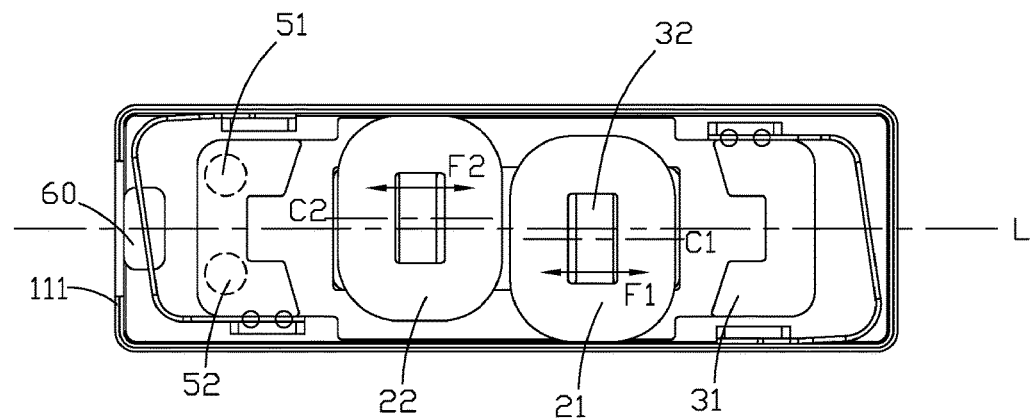
FIG. 3 is a top view of the vibration motor in FIG. 1, wherein a cover plate and a circuit board thereof has been removed.
Figure 4:
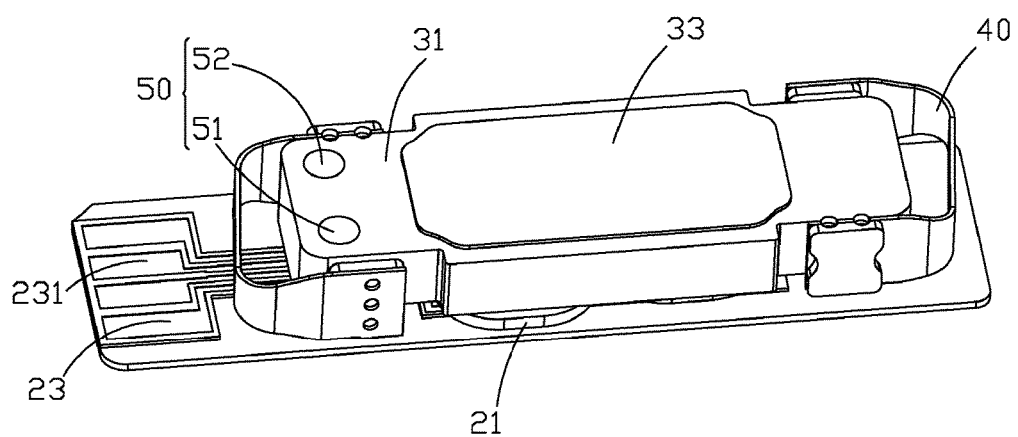
FIG. 4 is an isometric view of the vibration motor in FIG. 1 with a housing thereof removed.
Figure 5:
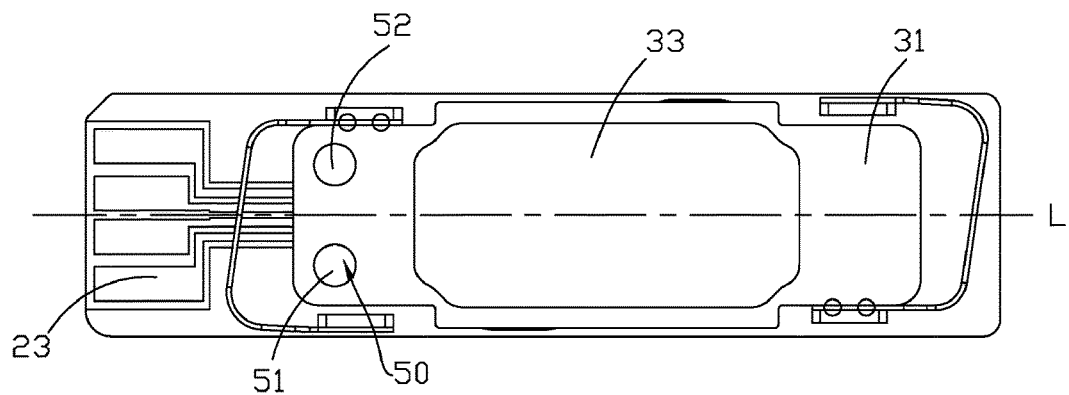
FIG. 5 is a top view of the vibration motor in FIG. 4.

As shown specifically in FIGS. 3-5, the vibration motor 100 includes a central shaft L extending along the vibration direction X and passes through the center of the main magnet 32. The first coil 21 and the second coil 22 are such arranged that a geometric center of one of the first coil 21 and the second coil 22 deviates from the central shaft L, a geometric center of the other of the first coil 21 and the second coil 22 deviates from the central shaft L, and the two geometric centers locate at two opposed sides of the central shaft L. Further, the first coil 21 and the second coil 22 deviate from the main magnet 32 respectively in different sides. Specifically, the first coil 21 is provided with a first central line C1 parallel to the vibration direction X, and the second coil 22 is provided with a second central line C2 parallel to the vibration direction X. The first central line C1 and the second central line C2 are located respectively on two opposed sides of the central shaft L. Optionally, a distance from the first central line C1 of the coil 21 to the central shaft L is the same as a distance from the second central line C2 of the second coil 22 to the central shaft L.

The first coil 21 and the second coil 22 are not symmetrical in position and located respectively at different sides of the central shaft L. When the first coil 21 and the second coil 22 are applied with same current or voltage, their driving forces (see FIG. 3, F1 is the first driving force of the first coil 21 and F2 is the second driving force of the second coil 22) are same. The join forces drive the vibration module 30 to vibrate along direction X. When the vibration of the vibration module 30 deviates from direction X, the current or voltage of the first coil 21 and the second coil 22 can be changed according to the deviation direction and position of the vibration module 30, so the first driving force F1 and the second driving force F2 are not equal. A rotational torque required can turn the vibration module 30, so the vibration module 30 returns to direction X and keeps vibration along direction X, thereby avoid collision between the vibration module 30 and the housing 50 or make noise, protect the vibration motor finally.

The first coil 21 and the second coil 22 respectively can be one coil or several coils. Several coils are preferred as they can control further the movement of the vibration module 30.

In order to control in real-time the movement of the vibration module 30, and improve control accuracy, as shown in FIGS. 3-5, the vibration motor also includes a sensor 50 for detecting the displacement of the vibration module 30 on the direction vertical to the central shaft L. When the sensor detects the vibration module deviates from the central shaft L and displacement of the vibration module at the direction vertical to the central shaft L, the current or voltage on the first coil 21 and the second coil 22 can be adjusted, thereby adjusting the vibration direction of the vibration module 30, so the vibration module 30 once again returns to direction X in linear vibration.

The sensor 50 can be hall sensor, laser sensor or displacement sensor. In this embodiment, hall sensor is preferred.

In order to detect more accurately the deviation of the vibration module 30, the sensor 50 includes a first hall sensor 51 and a second hall sensor 52. The first hall sensor 51 and the second hall sensor 52 are located symmetrically to the central shaft L. When the vibration module 30 vibrates, the first hall sensor 51 and the second hall sensor 52 respectively detect the magnetic field strength on both sides of the central shaft of the main magnet 32 and output hall voltage, and can judge the swing of the vibration module 30 along the direction vertical to the central shaft according to the hall voltage. Specifically, as the first hall sensor 51 and the second hall sensor 52 are located symmetrically to the central shaft L of the main magnet, when the vibration module 30 vibrates linearly along this direction, two hall sensors have same output voltage. If the output voltage is different, the sensor can judge the swing of the vibration module 30 along the direction vertical to the central shaft. By comparing the difference of two voltage outputs, the sensor can determine which direction the vibration module 30 swings, thereby control and adjust the input voltage or current on the first coil 21 and the second coil 22 according to the difference of two voltage outputs.

As shown in FIGS. 3-5 further, in this embodiment, the first hall sensor 51 and the second hall sensor 52 are installed at same side of the weight 31, and located symmetrically to the central shaft L. In this embodiment specifically, the first hall sensor 51 and the second hall sensor 52 are installed on the weight 31 at the side away from the first coil 21 and the second coil 22, not on the weight 31 at the side close to the first coil 21 and the second coil 22, so they are expressed by dotted line in FIG. 3. In addition, in this embodiment, the first hall sensor 51 and the second hall sensor 52 are separated from the pole plate 33.

Certainly, in other embodiments, the first hall sensor 51 and the second hall sensor 52 can be installed on the weight 31 at the side close with the first coil 21 and the second coil 22.

Figure 6:
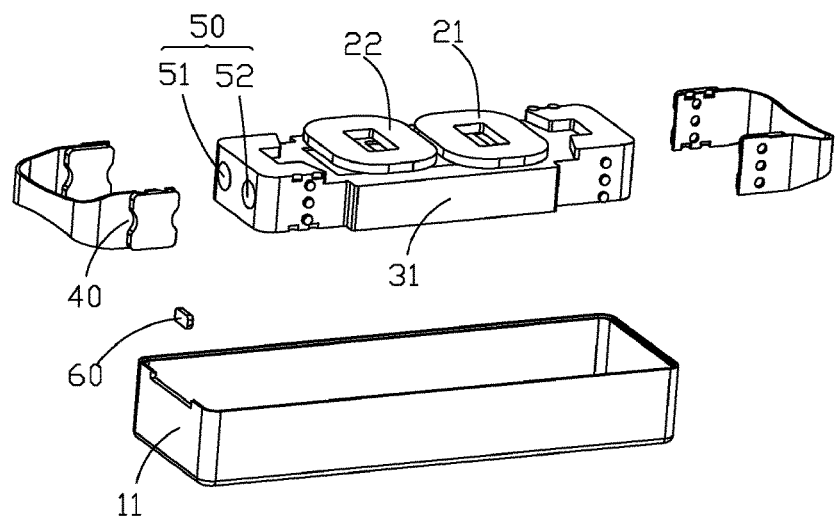
FIG. 6 is an isometric view of a vibration motor in accordance with a second exemplary embodiment of the present disclosure, wherein a cover plate and a circuit board thereof has been removed.
Figure 7:
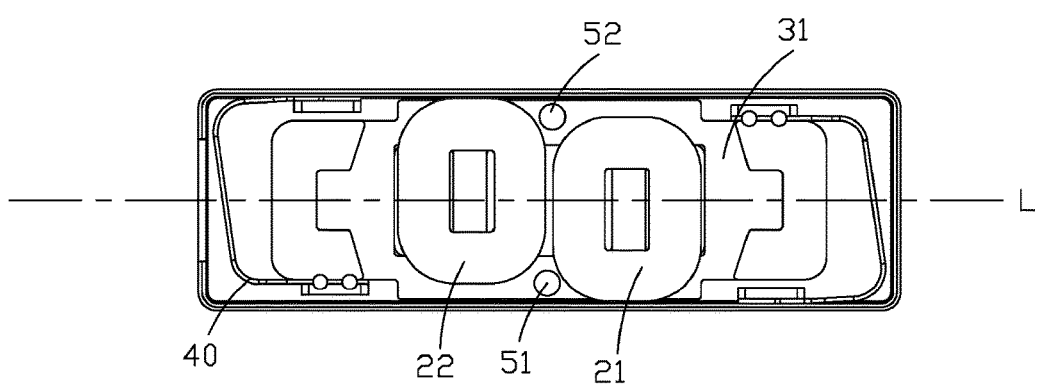
FIG. 7 is an isometric view of a vibration motor in accordance with a third exemplary embodiment of the present disclosure, wherein a cover plate and a circuit board thereof has been removed.

In addition, as shown in FIG. 6, the first hall sensor 51 and the second hall sensor 52 can be installed on the weight 31 at the side facing the elastic connecting part 40. Certainly, the first hall sensor 51 and the second hall sensor 52 can be installed on the housing 11 or the cover plate 12 as shown in FIG. 7. The specific position of the first hall sensor 51 and the second hall sensor 52 is not restricted in the present utility model.

In addition, the housing 11 is provided optionally with an auxiliary magnet 60 which is installed preferably near the first hall sensor 51 and the second hall sensor 52. This arrangement can strengthen the magnetic field intensity and improve the detection accuracy on the first hall sensor 51 and the second hall sensor 52. In this embodiment, the auxiliary magnet is installed preferably on the side wall 111 of the housing 11 vertical to the central shaft L. As shown in FIGS. 4-5, the end of circuit board 23 is provided with four soldering pads 231, used for controlling the current of the first coil 21 and the second coil 22.

In the vibration motor disclosed in the present application, as the sensor can detect the vibration straightness of the vibration module, the first coil and the second coil are not symmetrical in position, when the vibration module deviates from the original linear vibration direction, the current or voltage of the first coil and the second coil can be changed, thereby getting a rotational torque, which can adjust the vibration direction of the vibration module, keep the vibration module to move straightly, thereby avoid collision between the vibration module and the housing or make noise, and protect the vibration motor finally.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor including:
   a housing;
   a vibration module including a main magnet and a central shaft extending along a vibration direction and passing through a center of the main magnet;
   a fixing module located in the housing and including a first coil and a second coil spaced from the main magnet;
   an elastic connecting part suspending the vibration module in the housing;
   a sensor for detecting a displacement of the vibration module along a direction perpendicular to the central shaft; wherein
   the first coil and the second coil are such arranged that a geometric center of one of the first coil and the second coil deviates from the central shaft, a geometric center of the other of the first coil and the second coil deviates from the central shaft, and the two geometric centers locate at two opposed sides of the central shaft.

2. The vibration motor as described in claim 1, wherein the first coil is provided with a first central line parallel to the vibration direction and the second coil is provided with a second central line parallel to the vibration direction, the first central line and the second central line locate respectively at different sides of the central shaft.

3. The vibration motor as described in claim 2, wherein a distance from the first central line to the central shaft is the same as a distance from the second central line to the central shaft.

4. The vibration motor as described in claim 1, wherein the sensor includes a first hall sensor and a second hall sensor, the first hall sensor and the second hall sensor locate symmetrically to the central shaft.

5. The vibration motor as described in claim 4, wherein the vibration module further includes a weight, the main magnet is accommodated in the weight, and the first hall sensor and the second hall sensor are arranged at same side of the weight.

6. The vibration motor as described in claim 4, wherein the housing includes a housing body and a cover plate forming an accommodation space with the housing body, and, the first hall sensor and the second hall sensor are installed on the housing or the cover plate.

7. The vibration motor as described in claim 6, wherein the fixing module also includes a circuit board fixed on the cover plate, and the circuit board is provided with four soldering pads for controlling and connecting electrically the first coil and the second coil.

8. The vibration motor as described in claim 4, wherein the housing is further provided with an auxiliary magnet near the first hall sensor and the second hall sensor.

9. The vibration motor as described in claim 1, wherein the sensor is a laser sensor or a displacement sensor.

* * * * *